(12) United States Patent
Yabe

(10) Patent No.: US 12,468,489 B2
(45) Date of Patent: Nov. 11, 2025

(54) SERVICE PROVIDING APPARATUS AND METHOD FOR CONTROLLING SAME

(71) Applicant: CANON KABUSHIKI KAISHA, Tokyo (JP)

(72) Inventor: Kenta Yabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/529,186

(22) Filed: Dec. 5, 2023

(65) Prior Publication Data

US 2024/0192899 A1  Jun. 13, 2024

(30) Foreign Application Priority Data

Dec. 13, 2022 (JP) ................. 2022-198735

(51) Int. Cl.
*G06F 15/00* (2006.01)
*G06F 3/12* (2006.01)

(52) U.S. Cl.
CPC .......... *G06F 3/1203* (2013.01); *G06F 3/1229* (2013.01)

(58) Field of Classification Search
None
See application file for complete search history.

(56) References Cited

U.S. PATENT DOCUMENTS

2017/0111235 A1* 4/2017 Ishikura .............. H04L 43/0817
2019/0188362 A1* 6/2019 Uchibori ............ H04N 1/00411

FOREIGN PATENT DOCUMENTS

JP  2017083982 A  5/2017

* cited by examiner

*Primary Examiner* — Mark R Milia
(74) *Attorney, Agent, or Firm* — ROSSI, KIMMS & McDOWELL LLP

(57) ABSTRACT

A service providing apparatus provides a service using a plurality of devices. The apparatus includes a notice obtaining unit configured to obtain a replacement notice specifying a replacement source device, a code issuing unit configured to issue a replacement code associated with the replacement source device specified in the replacement notice, a request obtaining unit configured to obtain a continuation request including the replacement code, the continuation request specifying a replacement destination device, and a managing unit configured to request one or more management servers to manage the replacement destination device specified in the continuation request instead of the replacement source device associated with the replacement code included in the continuation request.

11 Claims, 9 Drawing Sheets

PRINTING MANAGEMENT SERVER

440

| REPLACEMENT SOURCE SERIAL NUMBER (441) | REPLACEMENT CODE (442) |
|---|---|
| DEV102 | AA33-BBG3 |
| ... | ... |

443

105

DEVICE MANAGEMENT SERVER

450

| SERIAL NUMBER (451) | TITLE (452) | MAC ADDRESS (453) | REGISTRATION CODE (454) |
|---|---|---|---|
| DEV102 | OldPrinter | F8A26DA84AA3 | 2345-3456 |
| DEV103 | NewPrinter |  | 3309-2234 |
| ... | ... | ... | ... |

455, 456

106

LICENSE MANAGEMENT SERVER

460

| SERVICE IDENTIFICATION INFORMATION (461) | SERIAL NUMBER (462) |
|---|---|
| Printer | DEV102 |
| ... | ... |

463

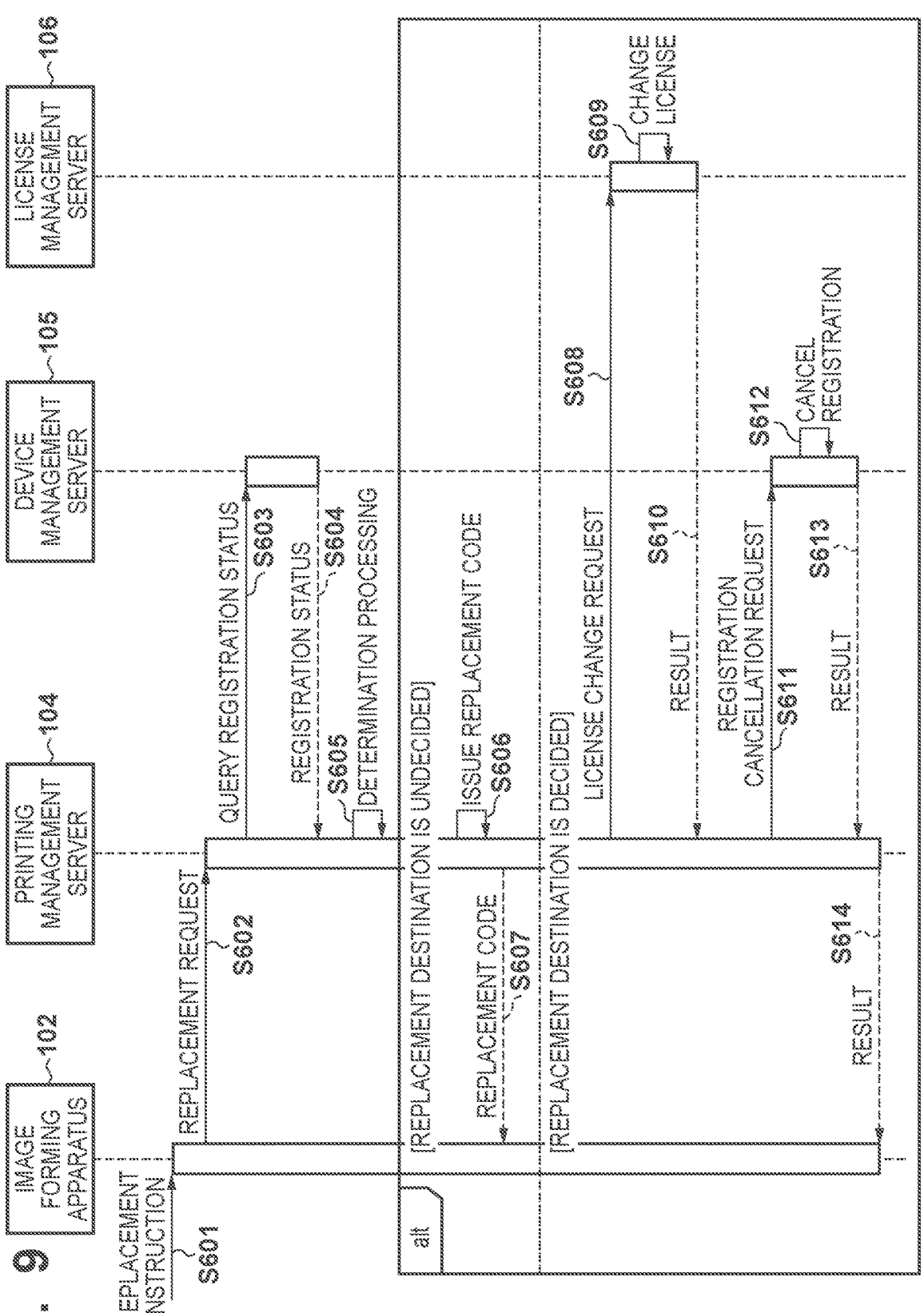

SERVICE PROVIDING APPARATUS AND METHOD FOR CONTROLLING SAME

BACKGROUND OF THE INVENTION

Field of the Invention

The present invention relates to a service providing apparatus and a method for controlling the same.

Description of the Related Art

A system referred to as the internet of things (hereinafter, IoT) that collects data from a plurality of devices and provides services on the basis of the data is known. An image forming apparatus (multi functional printer (MFP) with multiple functions also functions as a client terminal that connects to the IoT. A device connected to a service is managed in the system in a state in which the device is uniquely identifiable. Thus, when the device is replaced, both service registration cancellation for the pre-replacement device and service registration for the post-replacement new device must be performed. Japanese Patent Laid-Open No. 2017-083982 describes issuing an updated license to a post-replacement image forming apparatus when the image forming apparatus is replaced. To replace the device, both the pre-replacement device and the post-replacement device are designated in the system. However, when a device is replaced, there are cases where the post-replacement device cannot be obtained or the pre-replacement device is faulty and cannot be used, for example.

SUMMARY OF THE INVENTION

An aspect of the present disclosure reduces the restrictions relating to device replacement. According to some embodiments, a service providing apparatus for providing a service using a plurality of devices is provided. The apparatus comprises: a notice obtaining unit configured to obtain a replacement notice specifying a replacement source device; a code issuing unit configured to issue a replacement code associated with the replacement source device specified in the replacement notice; a request obtaining unit configured to obtain a continuation request including the replacement code, the continuation request specifying a replacement destination device; and a managing unit configured to request one or more management servers to manage the replacement destination device specified in the continuation request instead of the replacement source device associated with the replacement code included in the continuation request.

Further features of the present invention will become apparent from the following description of exemplary embodiments with reference to the attached drawings.

BRIEF DESCRIPTION OF THE DRAWINGS

FIG. 4 is a diagram for describing an example of information managed by an apparatus according to some embodiments.

FIG. 9 is a sequence diagram for describing an example of registration processing according to a modified example.

DESCRIPTION OF THE EMBODIMENTS

Figure 1:
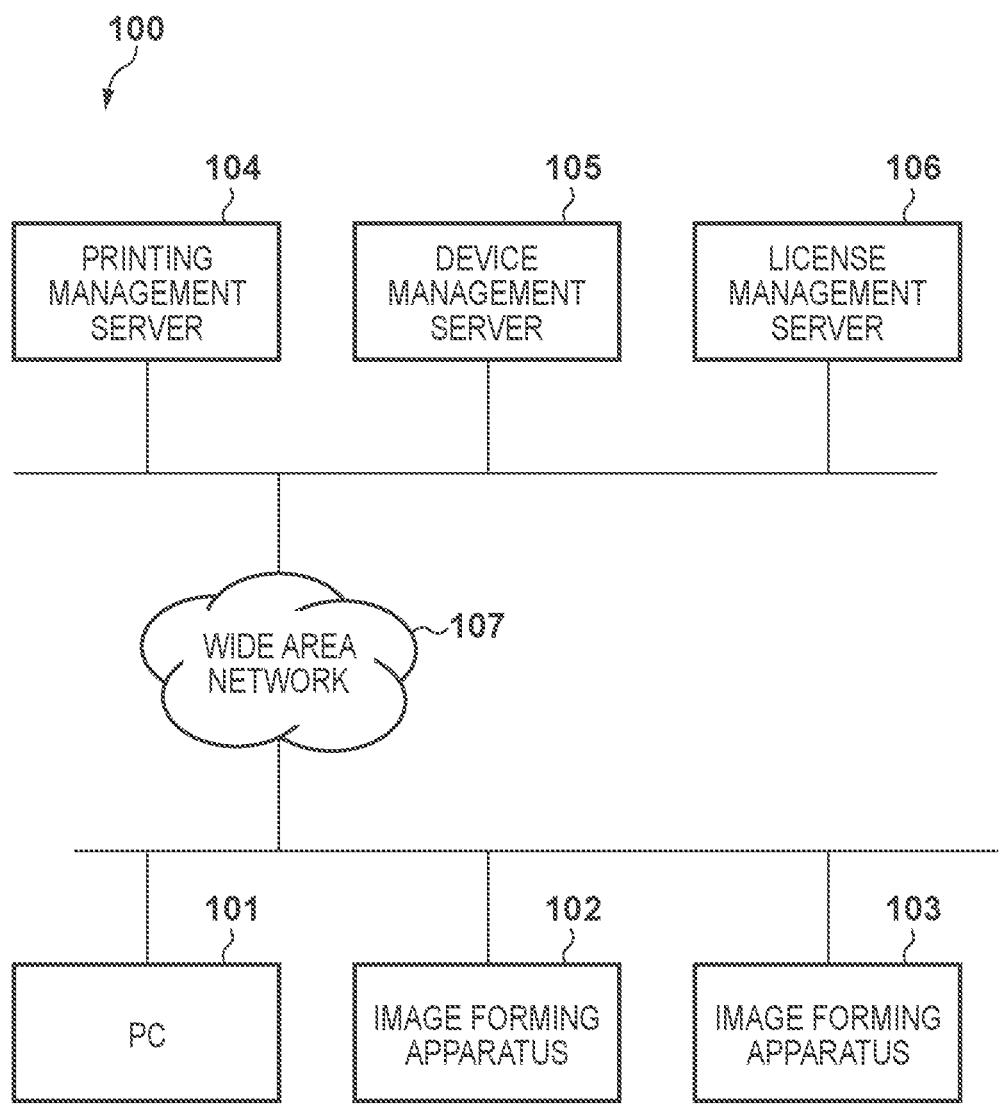
FIG. 1 is a block diagram for describing an example of the configuration of a printing system according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An example of the configuration of a printing system 100 according to some embodiments will be described with reference to FIG. 1. The printing system 100 may include a personal computer (PC) 101, image forming apparatuses 102 and 103, a printing management server 104, a device management server 105, and a license management server 106. The printing system 100 may be configured by only one or more of these components and may also include other components. Each server may be implemented by an application server on one or more server computers with the function of each server being provided as a service. Also, each server may be operated as an application server on a virtual machine using a hardware resource on one or more computers. The number of components illustrated in FIG. 1 is not limited to the example in FIG. 1, and the printing system 100 may include a plurality of each component.

In the example in FIG. 1, the PC 101, the image forming apparatus 102, and the image forming apparatus 103 are connected to the same area network (LAN). The LAN is connected to a wide area network 107 such as an internet. Alternatively, the PC 101, the image forming apparatus 102, and the image forming apparatus 103 may be connected to separate LANs. The printing management server 104, the device management server 105, and the license management server 106 are also connected to the wide area network 107. The PC 101, the image forming apparatus 102, and the image forming apparatus 103 can each communicate with the servers via the wide area network 107. Also, the printing management server 104, the device management server 105, and the license management server 106 can also communicate with one another via the LAN or the wide area network 107.

The PC 101 is an information processing apparatus that can use a printing service provided by the printing management server 104. An apparatus that uses a service provided by a server may be referred to as a client terminal. An information processing apparatus other than the PC 101, such as a smartphone, a tablet computer, or the like, may be used. The PC 101 may be installed with a web browser, a printer driver, and the like.

The image forming apparatuses 102 and 103 are image forming apparatus that can a printing service provided by the printing management server 104. For example, the image forming apparatuses 102 and 103 obtain a print job from the printing management server 104 via the wide area network 107 and execute printing according to the print job. The image forming apparatuses 102 and 103 may each be a multi functional printer (MFP) with a plurality of functions or may each be a single function apparatus with only a print function. In the example described below, the image forming apparatuses 102 and 103 are MFPs.

The printing management server 104 is a server that provides a printing service use a plurality of devices. A server that provides a service like the printing management server 104 may be referred to as a service providing apparatus. The printing management server 104 may receive a print request including print data from the PC 101 and transmit a print job corresponding to the print request to the image forming apparatus (for example, the image forming apparatus 102 or 103). The printing management server 104 may also provide various additional functions relating to the printing processing. A service provided via the wide area network 107 may be referred to as an internet service.

The device management server 105 is a server that manages devices registered with the printing service. The printing management server 104, to provide a printing service, may be able to use a device registered in the device management server 105 or may be unable to use a device that is not registered in the device management server 105. The device management server 105 may be able to uniquely identify a device registered in it. A device registered with a printing service may include both a device (for example, the PC 101) that receives a print request and a device (for example, the image forming apparatus 102 or 103) that receives and executes a print job.

The license management server 106 is a server that manages the licenses (privileges) for devices to access the printing service. A device provided with a license by the license management server 106 may be able to access the printing service. A device not provided with a license by the license management server 106 may be unable to access the printing service. A device provided with a license may include both a device (for example, the PC 101) that receives a print request and a device (for example, the image forming apparatus 102) that receives and executes a print job. The license management server 106 may also manage the licenses of other services and not only the licenses of the printing service provided by the printing management server 104.

Figure 2A:
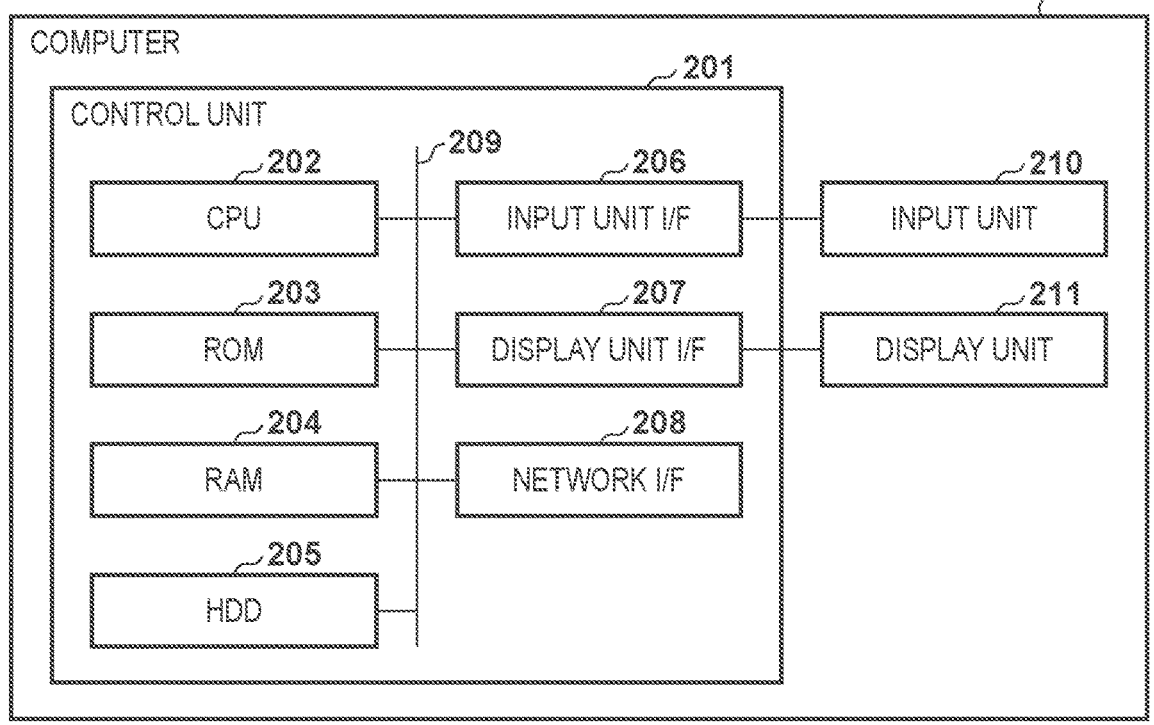
FIGS. 2A and 2B are block diagrams for describing an example of the hardware configuration of apparatuses according to some embodiments.

An example of the hardware configuration of a computer 200 will now be described with reference to FIG. 2A. The computer 200 may include the components illustrated in FIG. 2A. The computer 200 may not include one or more of the components illustrated in FIG. 2A and may include components not illustrated in FIG. 2A. The computer 200 may be used as any one of the PC 101, the printing management server 104, the device management server 105, and the license management server 106. The components of the computer 200 may be implemented by physical hardware. Additionally or alternatively, the components of the computer 200 may be implemented as virtual hardware that provides similar functions via virtual techniques.

The computer 200 may include a control unit 201, an input unit 210, and a display unit 211. The control unit 201 may include the components described below.

A central processing unit (CPU) 202 is a processor that controls the components of the computer 200. For example, the CPU 202 may execute a boot program stored in a read-only memory (ROM) 203 to run an operating system (OS). Also, the CPU 202 may execute an application program stored in a hard disk drive (HDD) 205 on the OS to execute various types of processing. In some embodiments, the application program described using FIG. 3 may also be stored in the HDD 205. A random-access memory (RAM) 204 is used as the work area of the CPU 202. The HDD 205 is a secondary storage apparatus that stores settings, history information, and the like of the application program and the computer 200 described above.

The ROM 203 and the RAM 204 together with an input unit interface (I/F) 206, a display unit I/F 207, and a network I/F 208 are connected to the CPU 202 via a system bus 209. The input unit I/F 206 is an interface for the input unit 210, which is constituted by a mouse, a keyboard, and/or the like. The input unit I/F 206 transmits information input by the user via the input unit 210 to the CPU 202.

The display unit I/F 207 transmits image data to be displayed on the display unit 211, which is constituted by a display or the like, to the display unit 211. The network I/F 208 is connected to a network such as a LAN or the like. The network I/F 208 transmits and receives information to and from the apparatuses on the network.

Figure 2B:
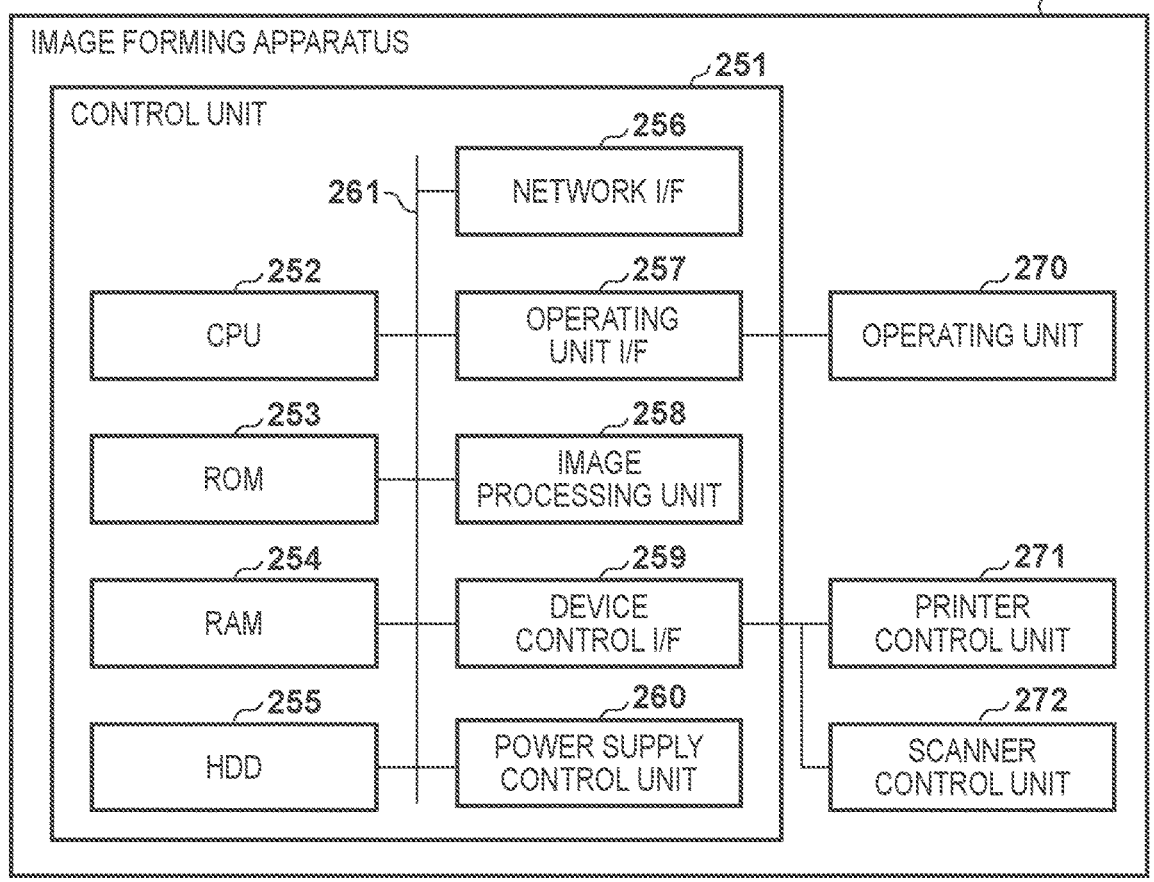

An example of the hardware configuration of an image forming apparatus 250 will now be described with reference to FIG. 2B. The image forming apparatus 250 may include the components illustrated in FIG. 2B. The image forming apparatus 250 may not include one or more of the components illustrated in FIG. 2B and may include components not illustrated in FIG. 2B. The image forming apparatus 250 may be used as any one of the image forming apparatuses 102 and 103.

The image forming apparatus 250 includes a control unit 251, an operating unit 270, a printer control unit 271, and a scanner control unit 272. The control unit 251 may include the components described below.

A CPU 252, a ROM 253, a RAM 254, an HDD 255, and a network I/F 256 are similar to the CPU 202, the ROM 203, the RAM 204, the HDD 205, and the network I/F 208, and thus this redundant description will be skipped.

The ROM 253 and the RAM 254 together with an operating unit I/F 257, an image processing unit 258, a device control I/F 259, a power supply control unit 260, and the network I/F 256 are connected to the CPU 252 via a system bus 261. The operating unit I/F 257 is an interface for the operating unit 270, which is constituted by a touch panel, physical buttons, or the like. The operating unit I/F 257 transmits the image data to be displayed on the operating unit 270 to the operating unit 270. Also, the operating unit I/F 257 transmits information input by the user via the operating unit 270 to the CPU 252.

The device control I/F 259 is connected to the scanner control unit 272 and the printer control unit 271. The device control I/F 259 performs synchronous/non-synchronous transformations of the image data. The printer control unit 271 executes printing by controlling the printer. The scanner control unit 272 reads image data from a document by controlling the scanner.

The image processing unit 258 executes processing including processing of printer output images, processing of scanner input images, image rotation, image compression, resolution conversion, color space conversion, tone conversion, and the like. The power supply control unit 260 executes power supply control for the entire image forming apparatus 250. The power supply control unit 260 may control not only the on/off of the power but also the transition to a power saving state, returning to a normal state, and the like.

Figure 3:
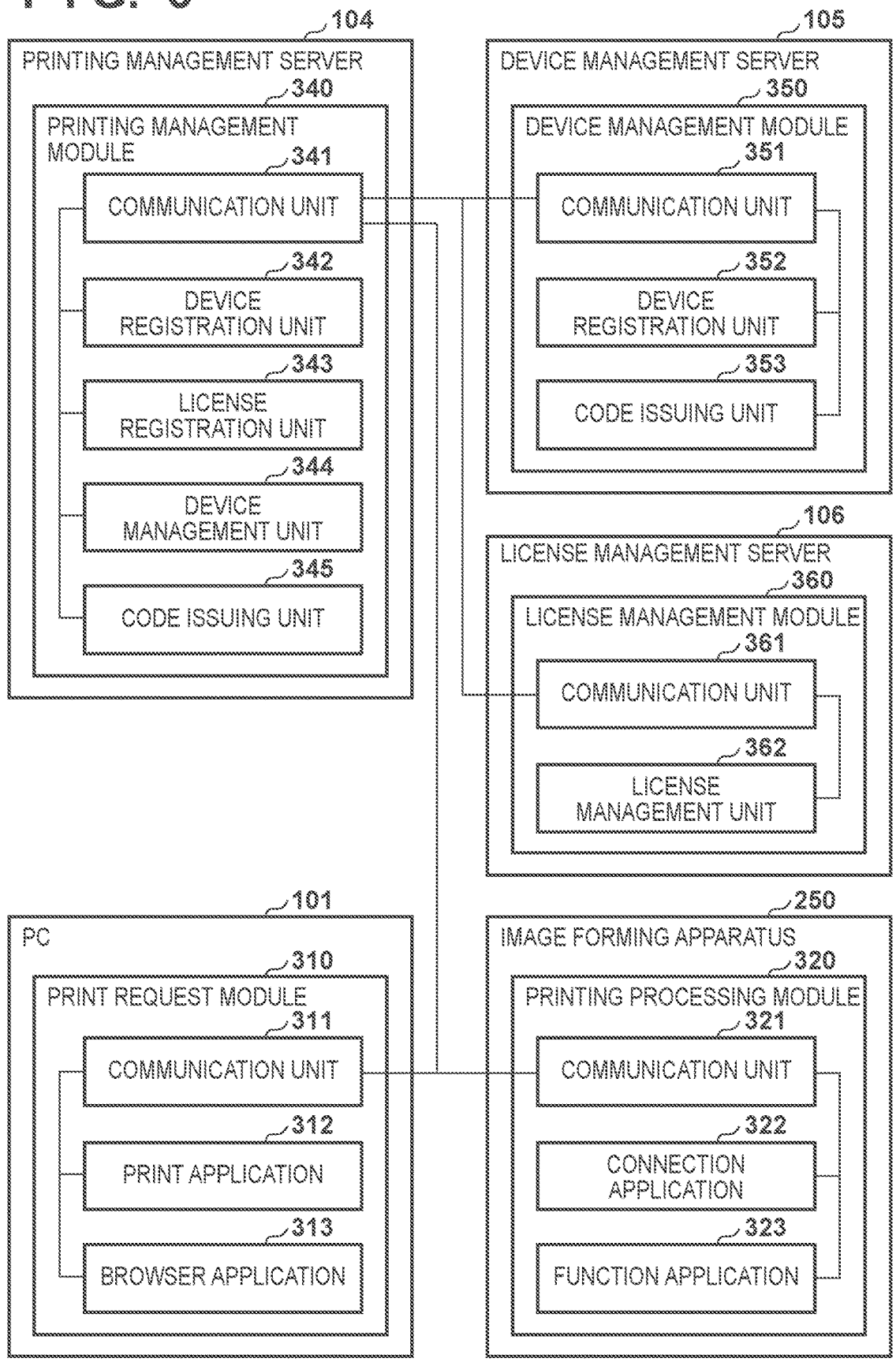
FIG. 3 is a block diagram for describing an example of the software configuration of an apparatus according to some embodiments.

Examples of the software configuration of the PC 101, the image forming apparatus 250, the printing management server 104, the device management server 105, and the license management server 106 will now be described with reference to FIG. 3. These apparatuses may include the components illustrated in FIG. 3. These apparatuses may not include one or more of the components illustrated in FIG. 3 and may include components not illustrated in FIG. 3. The image forming apparatuses 102 and 103 may each have the software configuration described with reference to the image forming apparatus 250.

The components of the PC 101, the printing management server 104, the device management server 105, and the license management server 106 may be implemented by the CPU 202 of the computer 200 used as these apparatuses executing a program loaded into the RAM 204. The components of the image forming apparatus 250 may be implemented by the CPU 252 executing a program loaded into the RAM 254.

The PC 101 may include a print request module 310. The print request module 310 is a software module with a function for executing a series of printing processes and device replacement processes via the PC 101. A device replacement process may be a device used in the printing system 100 being replaced with a different device that has not been used in the printing system 100. Hereinafter, a device that can be used in the printing system 100 before device replacement is referred to as the replacement source device. The replacement source device may also be referred to as the existing device, the former device, the pre-replacement device, the source device, and the like. Hereinafter, a device that can be used in the printing system 100 after device replacement is referred to as the replacement destination device. The replacement destination device may be also be referred to as the new device, the post-replacement device, the target device, and the like. The replacement source device can be used in the printing system 100 before replacement becomes unable to be used in the printing system 100 after replacement. The replacement destination device cannot be used in the printing system 100 before replacement becomes able to be used in the printing system 100 after replacement.

In some embodiments, a condition for using the replacement destination device in the printing system 100 may include the replacement destination device being registered in the device management server 105. Additionally or alternatively, this condition may include a license being provided to the replacement-destination device by the license management server 106.

A communication unit 311 may transmit a print request and a device replacement request to the printing management server 104 via the wide area network 107. The print request is a request to execute printing. The print request may be similar to a print request in a known printing service, and thus a description is skipped. The device replacement request is a request to replace a device. The device replacement request will be described below in detail. Also, the communication unit 311 may transmit a print request to the image forming apparatus 102 or 103 with the LAN without using the wide area network 107.

A print application 312 is an application program that generates a print request that is transmitted to the printing management server 104. The print application 312 may be a printer driver.

A browser application 313 is an application program for operating the user interface provided by the printing management server 104. The user may transmit a device replacement request to the printing management server 104 using browser application 313 to execute device replacement processing. The browser application 313 may be a web browser. The browser application 313 may generate a device replacement request.

The image forming apparatus 250 may include a printing processing module 320. The printing processing module 320 is a module with a function for executing a series of printing processes in the image forming apparatus 250 and a function for connecting to the printing management server 104 to exchanging data.

A communication unit 321 may receive a print request from the printing management server 104 via the wide area network 107 or from the PC 101 via the LAN. The communication unit 311 may connect to the printing management server 104 via the wide area network 107 to exchange information with the printing management server 104.

A connection application 322 executes processing for connecting to the printing management server 104. The connection application 322 may accept a processing instruction from the user via the operating unit 270.

A function application 323 is an application corresponding to a function such as copying, printing, mail transmitting, and the like. The function application 323 for executing processing is run when triggered by a user operation via the operating unit 270, data reception via the network, or the like. For example, when a print request is received from the printing management server 104, the function application 323 for printing is run.

The printing management server 104 may include a printing management module 340. The printing management module 340 is a software module with a function for executing a series of printing management processes in the printing management server 104. Also, the printing management module 340 may include a function for replacing a device used in the printing system 100.

A communication unit 341, in order to provide a printing service, receives a print request from the PC 101 via the wide area network 107 and transmits print data to the image forming apparatus 250 (for example, the image forming apparatus 102). The communication unit 341 transmits a device replacement request to the device management server 105 and the license management server 106.

A device registration unit 342 may transmit a request for device replacement to the device management server 105. For example, the device registration unit 342 may request the device management server 105 to cancel the registration of the replacement source device and register the replacement destination device.

A license registration unit 343 requests the license management server 106 to update the license information in the device replacement processing. For example, the license registration unit 343 may request the license management server 106 to cancel the license of the replacement source device and provide a license to the replacement destination device.

A device management unit 344 manages the information of the image forming apparatus 250 that can use the printing service. A code issuing unit 345 issues a replacement code. The replacement code will be described below in detail.

The device management server 105 may include a device management module 350. The device management module 350 is a software module with a function for executing a series of device management processes in the device management server 105.

A communication unit 351 receives a query relating to the registration status of a device and a registration code request from the printing management server 104 via the wide area network 107. These queries and requests will be described below in detail.

A device registration unit 352 manages the information of the image forming apparatuses that can use the printing service provided by the printing management server 104. In the present embodiment, the device registration unit 352 manages the devices that are registered with the printing service provided by the printing management server 104. Alternatively or additionally, the device registration unit 352 may manage the devices registered with another service. A code issuing unit 353 issues a registration code. The registration code will be described below in detail.

The license management server 106 may include a license management module 360. The license management module 360 is a software module with a function for executing a series of license management processes in the license management server 106.

A communication unit 361 receives a license change request from the printing management server 104 via the wide area network 107. The license change request will be described below in detail. A license management unit 362 manages the information of the licenses for the printing service provided by the printing management server 104. In the present embodiment, the license management unit 362 manages the licenses for the printing service provided by the printing management server 104. Alternatively or additionally, the license management unit 362 may manage the licenses for another service.

Examples of the information managed by the printing management server 104, the device management server 105, and the license management server 106 will now be described with reference to FIG. 4. This information may be stored in the HDD 205 of the computer 200 used as the servers. In the example described below, the information is managed in a table format but may be managed in another format.

The printing management server 104 manages a code management table 440. The code management table 440 is a table for managing the replacement codes used in device replacement. The replacement code may be also referred to as a device replacement code. The replacement code may be represented by any characters. Each time a new replacement code is issued by the code issuing unit 345, a new record is added to the code management table 440.

The code management table 440 includes a replacement source serial number column 441 and a replacement code column 442. The code management table 440 may not include one or more of these columns or may include other columns. In a similar manner, other tables described below may not include one or more of the illustrated columns or may include columns that are not illustrated.

The replacement source serial number column 441 is a column for storing the serial number of replacement source devices. The serial number is an example of identification information for uniquely identifying a device. Instead of a serial number, other identification information may be used. The replacement code column 442 is a column for storing the issued replacement code in association with the replacement source device listed in the replacement source serial number column 441. In this manner, in the code management table 440, the replacement source devices and the replacement codes are associated together and managed.

The device management server 105 manages a device management table 450. The device management table 450 is a table for managing the information of the devices that may be used in the printing system 100. Each time a new registration code is issued by the code issuing unit 353, a new record is added to the device management table 450. The registration code may be a code used for registering a device in the device management server 105. The registration code may be also referred to as a device registration code. The registration code may be represented by any characters.

The device management table 450 includes a serial number column 451, a title column 452, a medium access control (MAC) address column 453, and a registration code column 454. The serial number column 451 is a column for storing the serial numbers of the devices managed by the device management server 105. Instead of a serial number, other identification information may be used. The title column 452 is a column for storing the titles provided by the user to the devices listed in the serial number column 451.

The MAC address column 453 is a column for storing the MAC addresses of the devices listed in the serial number column 451. The registration code column 454 is a column for storing the registration codes associated with and issued for the devices listed in the serial number column 451.

In this manner, in the device management table 450, the devices, the MAC addresses, and the registration codes are associated together and managed. The device registration unit 352 of the device management server 105 may recognize the devices with a MAC address stored in the MAC address column 453 as devices that are registered in the device management server 105. The device registration unit 352 may recognize the devices with a blank in the MAC address column 453 and devices without a serial number stored in the serial number column 451 are devices that are not registered in the device management server 105. In this manner, in the present embodiment, the device registration unit 352 manages the registration status of devices on the basis of whether or not the MAC address column 453 is blank. Alternatively, the device management table 450 may include a separate column for managing the registration status.

The license management server 106 manages a license management table 460. The license management table 460 is a table for managing the licenses of the devices that may be used in the printing system 100. Each time a license is provided to a device for a specific service by the license management unit 362, a new record is added to the license management table 460.

The license management table 460 includes a service identification information column 461 and a serial number column 462. The service identification information column 461 is a column for storing the information for identifying the service used by the device. Hereinafter, the information for identifying a service is referred to as service identification information. The service identification information may be unique for each service used by the device managed by the license management server 106. The serial number column 462 is a column for storing the serial number of the devices. Instead of a serial number, other identification information may be used.

In this manner, in the license management table 460, the service identification information and the devices are associated together and managed. The license management unit 362 of the license management server 106 may recognize that, regarding the services stored in the service identification information column 461, a license is provided to a device with a serial number stored in the serial number column 462. The license management unit 362 may recognize that devices without a serial number stored in the serial number column 462 have not been provided with a license.

Figure 5:
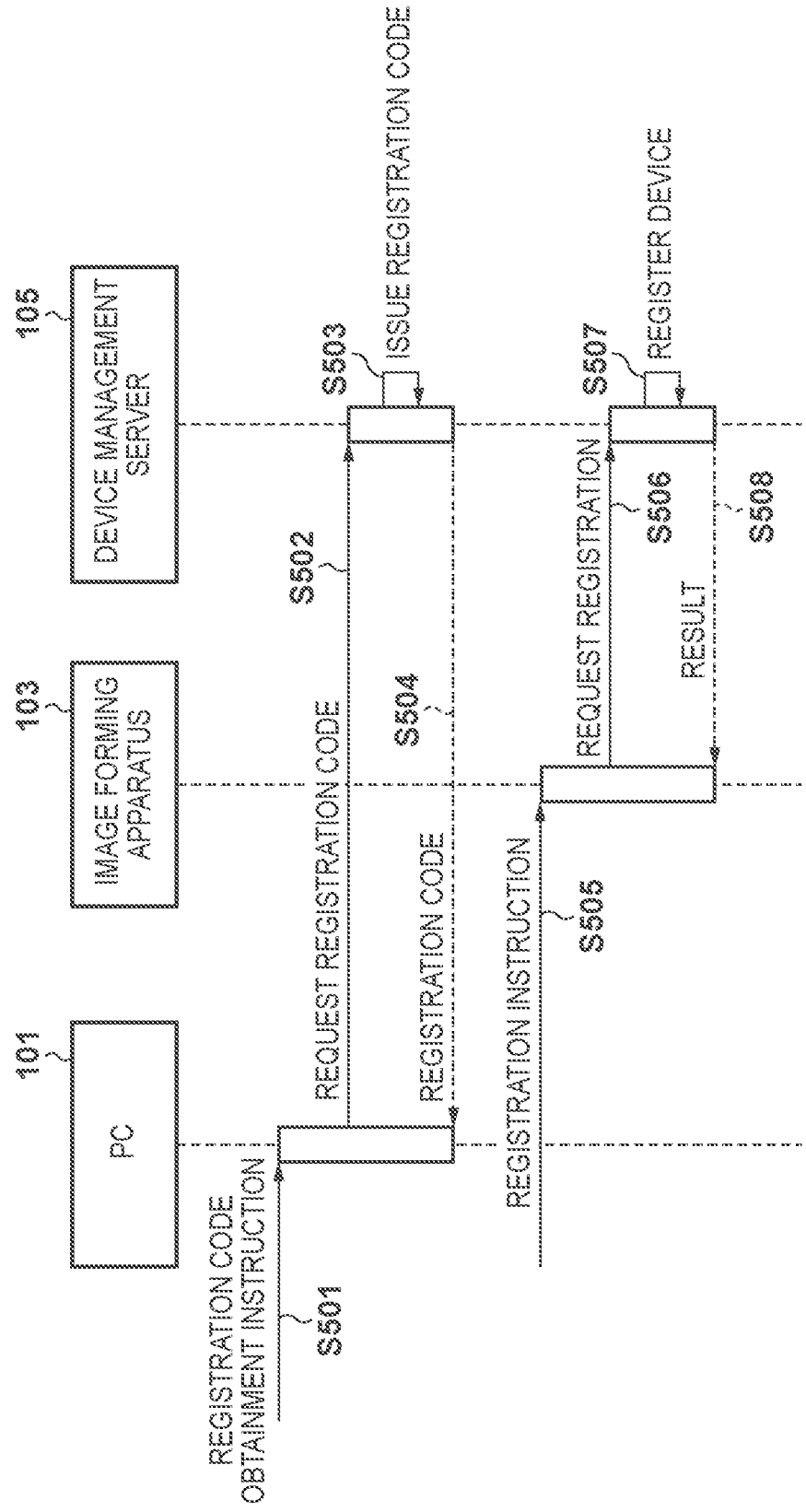
FIG. 5 is a sequence diagram for describing an example of registration processing according to some embodiments.

The operations for registering a device in the device management server 105 will now be described with reference to FIG. 5. In the example illustrated in FIG. 5, the device to be registered in the device management server 105 is the image forming apparatus 103. At the time of the start of the operations in FIG. 5, the image forming apparatus 103 is not registered in the device management server 105. The operations in FIG. 5 may be performed as preprocessing for device replacement or may be performed unrelated to device replacement.

In step S501, the PC 101 obtains a registration code obtainment instruction from the user via the input unit 210. The registration code obtainment instruction may be an instruction to obtain, from the device management server 105, a registration code used for registering the image forming apparatus 103 in the device management server 105. The instruction from the user may be obtained via a user interface provided by the browser application 313.

The registration code obtainment instruction may include information that specifies the device (in this example, the image forming apparatus 103) to be registered in the device management server 105. The information that specifies the device may be identification information that uniquely identifies the device. Such identification information may be used as the serial number of the device. In the example described below, the serial number of the device is used as the information that specifies the device.

The serial number (for example, "DEV103") of the image forming apparatus 103 may be stored in the ROM 253 or the HDD 255 of the image forming apparatus 103. The user can display the serial number on the operating unit 270 (for example, the display) of the image forming apparatus 103 and reference the manual or the like supplied with the image forming apparatus 103 to obtain the serial number of the image forming apparatus 103.

The registration code obtainment instruction may include a title (for example, "NewPrinter") for the image forming apparatus 103. The title may be used to allow the user to easily identify the device to be registered in the device management server 105. Obtaining the title of the image forming apparatus 103 may be omitted. In a case where obtaining the title of the image forming apparatus 103 is omitted, the processing using the title of the image forming apparatus 103 described below may also be omitted.

In step S502, the browser application 313 of the PC 101 generates a registration code request in response to the registration code obtainment instruction being obtained. The communication unit 311 of the PC 101 transmits the registration code request to the device management server 105. The registration code request may be a request asking for a registration code to be issued. The registration code request may include the serial number (for example, "DEV103") of the image forming apparatus 103 included in the registration code obtainment instruction. Also, the registration code request may include the title (for example, "NewPrinter") of the image forming apparatus 103 included in the registration code obtainment instruction. In this manner, the registration code request may include the serial number (for example, "DEV103") of the device to be registered and the title (for example, "NewPrinter") of the device.

In step S503, the communication unit 351 of the device management server 105 passes the registration code request received from the PC 101 to the device registration unit 352. This manner of receiving a request may be referred to as obtaining a request or request obtainment. The device registration unit 352 generates a new record in the device management table 450 and stores the information included in the registration code request in the record. Specifically, the device registration unit 352 stores the serial number included in the registration code request in the serial number column 451 and stores the title included in the registration code request in the title column 452. The code issuing unit 353 of the device management server 105 issues a registration code and stores the record in the registration code column 454.

In this manner, for example, a record 456 is added to the device management table 450. In the record 456, the serial number (for example, "DEV103") included in the registration code request and a registration code (for example, "3309-2234) generated in response to the registration code request are associated together. In this manner, the code issuing unit 353 issues a registration code associated with the device to be registered. At this point in time, the MAC address column 453 is blank. Thus, the image forming apparatus 103 is still not registered in the device management server 105.

In step S504, the communication unit 351 of the device management server 105 transmits the registration code issued in step S503 to the PC 101. The browser application 313 of the PC 101 presents the received registration code to the user via the display unit 211.

In step S505, the connection application 322 of the image forming apparatus 103 obtains a registration instruction from the user via the operating unit 270. The registration instruction may be an instruction to register the image forming apparatus 103 in the device management server 105. The registration instruction may include the registration code. The user may include the registration code (for example, "3309-2234") displayed by the PC 101 in step S504 in the registration instruction.

In step S506, the connection application 322 of the image forming apparatus 103 generates a registration request in response to the registration instruction being obtained. The communication unit 321 of the image forming apparatus 103 transmits the registration request to the device management server 105. The registration request may be a request asking for device registration. The registration request may include the registration code included in the registration instruction.

The registration request may include information that specifies the device (in this example, the image forming apparatus 103) to be registered in the device management server 105. In this manner, the information that specifies the image forming apparatus 103 may be the serial number (for example, "DEV103") of the image forming apparatus 103. The connection application 322 may read out the serial number of the image forming apparatus 103 from the ROM 253 or the HDD 255 or may obtain the serial number from the user.

The registration request may include the MAC address (for example, "11WE4RFT55YU") of the device (for example, the image forming apparatus 103) to be registered in the device management server 105. The connection application 322 may read out the MAC address of the image forming apparatus 103 from the ROM 253 or the HDD 255 or may obtain the MAC address from the user. In this manner, the registration request may include the registration code (for example, "3309-2234") issued to the device to be registered, the serial number (for example, "DEV103") of the device, and the MAC address (for example, "11WE4RFT55YU") of the device.

In step S507, the communication unit 351 of the device management server 105 passes the registration request received from the image forming apparatus 103 to the device registration unit 352. The device registration unit 352 searches the device management table 450 for a record with a value that matches the registration code included in the registration request in the registration code column 454. In a case where such a record is found, the device registration unit 352 stores the MAC address included in the registration request in the MAC address column 453 of the record. In this manner, the image forming apparatus 103 is registered in the device management server 105. In a case where such a record is not found, the device registration unit 352 discards the registration request.

In step S508, the communication unit 351 of the device management server 105 transmits the result of the registration request to the image forming apparatus 103. Specifically, the communication unit 351 issues a registration success notification in a case where a record is found in step S507. In a case where a record is not found in step S507, the communication unit 351 issues a registration failure notification. The image forming apparatus 103 may present the result of the registration request to the user.

The operations for replacing a device managed by one or more management servers will now be described with reference to FIG. 6. As described above, the plurality of devices used in a service provided by the printing management server 104 are managed by the device management server 105 and the license management server 106. In the example illustrated in FIG. 6, the replacement source device is the image forming apparatus 102, and the replacement destination device is the image forming apparatus 103. At the time of the start of the operations in FIG. 5, the image forming apparatus 102 is registered in the device management server 105. At the time of the start of the operations in FIG. 5, the image forming apparatus 102 has been provided with a license by the license management server 106. At the time of the start of the operations in FIG. 5, the image forming apparatus 103 may be registered in the device management server 105 or may not be registered. At the time of the start of the operations in FIG. 5, the image forming apparatus 103 has not been provided with a license by the license management server 106.

In step S601, the browser application 313 of the PC 101 obtains a replacement instruction from the user via the input unit 210. The replacement instruction may be an instruction to replace the image forming apparatus 102 being managed. At the point in time of step S601, the replacement destination device may be decided or may not be decided.

The replacement instruction may include information that specifies the replacement source device (in this example, the image forming apparatus 102). In a similar manner to the example described above, the serial number of the device may be used as the information that specifies the device. The method for obtaining the serial number (for example, "DEV102") of the image forming apparatus 102 may be similar to the method for obtaining the serial number of the image forming apparatus 103 described with reference to step S501, and thus this redundant description will be skipped.

The replacement instruction may include information that specifies the replacement destination device (in this example, the image forming apparatus 103). In a similar manner to the example described above, the serial number of the device may be used as the information that specifies the device. The method for obtaining the serial number (for example, "DEV103") of the image forming apparatus 103 may be similar to the method for obtaining the serial number of the image forming apparatus 103 described with reference to step S501, and thus this redundant description will be skipped. The replacement destination device may be already registered in the device management server 105 or may not yet be registered.

The replacement instruction may not include information that specifies the replacement destination device (in this example, the image forming apparatus 103). At the point in time of step S601, in a case where the replacement destination device is not decided, the user cannot know the information (for example, the serial number) that specifies the replacement destination device (in this example, the image forming apparatus 103). Thus, the user may not specify the replacement destination device. As described below, the user may continue the replacement processing after the replacement destination device is decided. The replacement instruction for an undecided replacement destination device may be referred to as a replacement notice instruction or simply as a notice instruction. In a case where the notice instruction is performed, device replacement may not be executed until the user specifies the replacement destination device.

In step S602, the browser application 313 of the PC 101 generates a replacement request in response to the replacement instruction being obtained. The communication unit 311 of the PC 101 transmits the replacement request to the printing management server 104. The replacement request may be a request asking for device replacement. The replacement request may include the serial number (for example, "DEV102") of the image forming apparatus 102 (the replacement source device) included in the replacement instruction. In a case where the replacement instruction includes the serial number (for example, "DEV103") of the image forming apparatus 103 (the replacement destination device), the replacement request may include the serial number of the image forming apparatus 103. A replacement request that does not include information that specifies that replacement destination device may be referred to as a replacement notice. Obtaining the replacement notice may be referred to as obtaining a notice.

In step S603, the communication unit 341 of the printing management server 104 passes the replacement request received from the PC 101 to the device management unit 344. The device management unit 344 queries the device management server 105 for the registration status of the device specified in the replacement request. The query may include the serial number of the replacement source device included in the replacement request. Also, in a case where the serial number of the replacement destination device is included in the replacement request, the query may include this serial number.

In step S604, the device registration unit 352 of the device management server 105 determines whether or not the device (the replacement source device and in some cases the replacement destination device) specified in the query is registered. Specifically, the device registration unit 352 searches the device management table 450 for a record that includes a value that matches the serial number included in the query in the serial number column 451 and that is not blank in the MAC address column 453. In a case where such a record is found, the device registration unit 352 determines that the device is registered. In a case where such a record is not found, the device registration unit 352 determines that the device is not registered. The device registration unit 352 notifies the printing management server 104 of the registration status of the device.

In step S605, the device management unit 344 of the printing management server 104 determines whether or not the replacement destination device is undecided on the basis of the registration status of the device specified in the replacement request. This processing is described below in detail. In a case where the replacement destination device is undecided, the device management unit 344 transitions the processing to step S606. In a case where the replacement destination device is decided, the device management unit 344 transitions the processing to step S608.

Steps S606 and S607 are executed in a case where the replacement destination device is undecided. For example, in a case where the replacement request includes the serial number (for example, "DEV102") of the replacement source device and does not include the serial number (for example, "DEV103") of the replacement destination device, steps S606 and S607 are executed.

In step S606, the code issuing unit 345 of the printing management server 104 generates a new record in the code management table 440 and stores the information included in the replacement request in the record. Specifically, the code issuing unit 345 stores the serial number (in this example, "DEV102") of the replacement source device included in the replacement request in the replacement source serial number column 441. The code issuing unit 345 issues a replacement code (for example, "AA33-BBG3") and stores this record in the replacement code column 442.

In this manner, a record 443 is added to the code management table 440. In the record 443, the serial number (for example, "DEV102") of the replacement source device included in the replacement request (in this example, the replacement notice) and the replacement code (for example, "AA33-BBG3") generated in response to the replacement request are associated together. In this manner, the code issuing unit 345 issues the replacement code associated with the replacement source device specified in the replacement notice.

In step S607, the communication unit 341 of the printing management server 104 transmits the replacement code issued in step S606 to the PC 101. The browser application 313 of the PC 101 presents the received replacement code to the user via the display unit 211.

Steps S608 to S614 are executed in a case where the replacement destination device is decided. For example, in a case where the replacement request includes the serial number (for example, "DEV102") of the replacement source device and the serial number (for example, "DEV103") of the replacement destination device, steps S608 to S614 are executed. Also, both the replacement source device and the replacement destination device are registered in the device management server 105. Here, the printing management server 104 requests one or more management servers to manage the replacement destination device specified in the replacement request instead of the replacement source device specified in the replacement request. In some embodiments, the one or more management servers which receive the replacement request may be a plurality of management servers and may include the device management server 105 and the license management server 106, for example.

In step S608, the license registration unit 343 of the printing management server 104 generates a license change request. The communication unit 341 of the printing management server 104 transmits the license change request to the license management server 106. The license change request may be a request asking for a license to be provided to a device. Specifically, the license change request may be request to delete the license provided to the replacement source device and provide a license to the replacement destination device. The license change request may include information (for example, "DEV102") specifying the replacement source device (for example, the image forming apparatus 102) and information (for example, "DEV103") specifying the replacement destination device (for example, the image forming apparatus 103). This information may be information included in the replacement request. Also, the license change request may include service identification information (for example, "Printer") of the printing service provided by the printing management server 104. The service identification information is allocated in the printing system 100 in advance and stored in the HDD 205 or the like of the printing management server 104.

In step S609, the communication unit 361 of the license management server 106 passes the received license change request to the license management unit 362. The license management unit 362 changes the license being managed according to the license change request. Specifically, the license management unit 362 searches the license management table 460 for a record that includes a value that matches the service identification information included in the license change request in the service identification information column 461 and that includes a value that matches the serial number of the replacement source device included in the license change request in the serial number column 462. The license management unit 362 rewrites the serial number column 462 of the found record with the serial number of the replacement destination device included in the license change request. For example, the serial number column 462 of a record 463 of the license management table 460 is rewritten from "DEV102" to "DEV103". In this manner, the license provided to the replacement source device (for example, the image forming apparatus 102) is deleted, and the license is provided to the replacement destination device (for example, the image forming apparatus 103). By managing the service identification information using the license management table 460, licenses can be provided and deleted per service even in cases where one device is used in a plurality of services. In some embodiments, the license management table 460 may not manage the service identification information.

In step S610, the communication unit 361 of the license management server 106 transmits the result of the license change request to the printing management server 104. Specifically, in a case where the license change is a success in step S609, the communication unit 361 notifies of change success. In a case where the license change is a failure in step S609, the communication unit 361 notifies of change failure.

In step S611, the device registration unit 342 of the printing management server 104 generates a registration cancellation request. The communication unit 341 of the printing management server 104 transmits the registration cancellation request to the device management server 105. The registration cancellation request may be a request asking for the registration of a device to be cancelled. Specifically, the registration cancellation request may be a request asking for the registration of the replacement source device to be cancelled. The registration cancellation request may include information (for example, "DEV102") that specifies the replacement source device (for example, the image forming apparatus 102). This information may be included in the replacement request.

In step S612, the communication unit 351 of the device management server 105 passes the received registration cancellation request to the device registration unit 352. The device registration unit 352 cancels the registration of the device according to the registration cancellation request. Specifically, the device registration unit 352 deletes the record including a value that matches the serial number of the replacement source device included in the registration cancellation request in the serial number column 451 from the device management table 450. For example, a record 455 in the device management table 450 is deleted. In this manner, the registration of the replacement source device (for example, the image forming apparatus 102) is cancelled.

In step S613, the communication unit 351 of the device management server 105 transmits the result of the registration cancellation request to the printing management server 104. Specifically, in a case where the cancellation of the registration of the device is a success in step S612, the communication unit 351 notifies of change success. In a case where the cancellation of the registration of the device is a failure in step S612, the communication unit 351 notifies of change failure.

In step S614, the communication unit 341 of the printing management server 104 transmits the result of the replacement request to the PC 101. Specifically, in a case where none of the operations described above failed, the communication unit 341 notifies of replacement success. In a case where any one of the operations described above failed, the communication unit 341 notifies of replacement failure. The PC 101 may present the result of the replacement request to the user.

The operations of step S605 in FIG. 6 will now be described in detail with reference to FIG. 7. In step S701, the device management unit 344 of the printing management server 104 determines whether or not the replacement source device is registered in the device management server 105. In a case where the replacement source device is determined to be registered in the device management server 105 ("YES" in step S701), the device management unit 344 transitions the processing to step S702. Otherwise ("NO" in step S701), the device management unit 344 transitions the processing to step S706. In a case where the replacement source device is not registered in the device management server 105, such a device cannot be replaced with another device. Thus, in step S706, the device management unit 344 may notify the user of an error.

In step S702, the device management unit 344 determines whether or not the replacement destination device is specified in the replacement request. In a case where the replacement destination device is specified in the replacement request ("YES" in step S702), the device management unit 344 transitions the processing to step S703. Otherwise ("NO" in step S702), the device management unit 344 transitions the processing to step S705. In a case where the replacement destination device is not specified in the replacement request (in other words, the replacement request is a replacement notice), in step S705, the device management unit 344 determines that the replacement destination is undecided. In this case, the processing of steps S606 and S607 in FIG. 6 is executed.

In step S703, the device management unit 344 determines whether or not the replacement destination device is registered in the device management server 105. In a case where the replacement destination device is determined to be registered in the device management server 105 ("YES" in step S703), the device management unit 344 transitions the processing to step S704. Otherwise ("NO" in step S703), the device management unit 344 transitions the processing to step S705. In a case where the replacement destination device is registered in the device management server 105, in step S704, the device management unit 344 determines that the replacement destination is decided. In this case, the processing of steps S608 to S614 in FIG. 6 is executed.

In a case where the replacement destination device is not registered in the device management server 105, in step S705, the device management unit 344 determines that the replacement destination is undecided. In this manner, even in a case where the replacement destination device is specified but not registered in the device management server 105, the device management unit 344 may issue a replacement code with the replacement destination set as undecided. Alternatively, in a case where the replacement destination device is specified but not registered in the device management server 105, the device management unit 344 may transition the processing to step S706 and notify the user of an error.

The operations for continuing the replacement of a device managed by one or more management servers will now be described with reference to FIG. 8. At the time of the start of operations in FIG. 8, the user is obtaining a replacement code via the operations in FIG. 6. In this example, when obtaining the replacement code, the user specifies the image forming apparatus 102 as the replacement source device. Thereafter, the user obtains the image forming apparatus 103 and replaces the image forming apparatus 103 with the image forming apparatus 102. In other words, the image forming apparatus 103 corresponds to the replacement destination device. At the time of the start of the operations in FIG. 8, the replacement source device is registered in the device management server 105, and a license has been provided to the replacement source device by the license management server 106. At the time of the start of the operations in FIG. 8, the replacement destination device is not registered in the device management server 105, and a license has not been provided to the replacement destination device by the license management server 106.

In step S801, the connection application 322 of the image forming apparatus 103 obtains a continuation instruction from the user via the operating unit 270. The continuation instruction may be an instruction to continue the replacement of the image forming apparatus 102 being managed.

The continuation instruction may include the replacement code. The replacement code is displayed on the PC 101 by the operations illustrated in FIG. 6 described above. As described above, in the printing management server 104, the replacement source device is managed in association with the replacement code.

The continuation instruction may include a title (for example, "NewPrinter") for the image forming apparatus 103. The title may be used to allow the user to easily identify the device to be registered in the device management server 105. Obtaining the title of the image forming apparatus 103 may be omitted. In a case where obtaining the title of the image forming apparatus 103 is omitted, the processing using the title of the image forming apparatus 103 described below may also be omitted.

The continuation instruction may not include information (for example, the serial number of the replacement source device) that specifies that replacement source device. Thus, the continuation instruction can be executed even when the information that specifies the replacement source device is forgotten or the replacement source device has already been relinquished.

In step S802, the connection application 322 of the image forming apparatus 103 generates a continuation request in response to the continuation instruction being obtained. The communication unit 321 of the image forming apparatus 103 transmits the continuation request to the printing management server 104. The continuation request may be a request asking for the replacement of the device to be continued.

The continuation request may include the replacement code and title included in the continuation instruction. The continuation request may include information that specifies the replacement destination device (in this example, the image forming apparatus 103). In a similar manner to the example described above, the serial number of the replacement destination device may be used as the information that specifies the replacement destination device. The serial number (for example, "DEV103") of the image forming apparatus 103 may be read out from the ROM 253 or the HDD 255 of the image forming apparatus 103. In this manner, the continuation request may include the replacement code (for example, "AA33-BBG3"), the serial number (for example, "DEV103") of the replacement destination device, and the title (for example, "NewPrinter") of the replacement destination device.

In step S803, the communication unit 341 of the printing management server 104 passes the continuation request received from the image forming apparatus 103 to the code issuing unit 345. The code issuing unit 345 determines whether or not the replacement code included in the continuation request is valid. Specifically, the code issuing unit 345 searches the code management table 440 for a record with a value that matches the replacement code included in the continuation request in the replacement code column 442. In a case where such a record is found, the code issuing unit 345 determines that the replacement code included in the continuation request is valid and transitions the processing to step S804. The serial number stored in the replacement source serial number column 441 of the found record is used as the information that specifies the replacement source device in the subsequent processing. In a case where such a record is not found, the code issuing unit 345 determines that the replacement code included in the continuation request is not valid. In this case, the code issuing unit 345 may notify the user of an error via the image forming apparatus 103.

In the processing of step S804 and onward, the printing management server 104 requests one or more management servers to manage the replacement destination device specified in the continuation request instead of the replacement source device specified in step S803. In some embodiments, the one or more management servers which receive the replacement request may be a plurality of management servers and may include the device management server 105 and the license management server 106, for example.

In step S804, the license registration unit 343 of the printing management server 104 generates a license deletion request after the replacement code has been determined to be valid in step S803. The communication unit 341 of the printing management server 104 transmits the license deletion request to the license management server 106. The license deletion request may be a request asking for a license provided to a device to be deleted. Specifically, the license deletion request may be a request asking for the license provided to the replacement source device to be deleted. The license deletion request may include information (for example, "DEV102") that specifies the replacement source device (for example, the image forming apparatus 102). This information may be the information specified in step S803. Also, the license deletion request may include service identification information (for example, "Printer") of the printing service provided by the printing management server 104.

In step S805, the communication unit 361 of the license management server 106 passes the received license deletion request to the license management unit 362. The license management unit 362 deletes the license being managed according to the license deletion request. Specifically, the license management unit 362 searches the license management table 460 for a record that includes a value that matches the service identification information included in the license deletion request in the service identification information column 461 and that includes a value that matches the serial number of the replacement source device included in the license deletion request in the serial number column 462. The license management unit 362 deletes the found record. For example, the record 463 in the license management table 460 is deleted. In this manner, the license provided to the replacement source device (for example, the image forming apparatus 102) is deleted. In a case where the license deletion request does not include service identification information, the license management unit 362 may delete, from the license management table 460, all of the records with a value that matches the serial number of the replacement source device included in the license deletion request in the serial number column 462.

In step S806, the communication unit 361 of the license management server 106 transmits the result of the license deletion request to the printing management server 104. Specifically, in a case where the license deletion is a success in step S805, the communication unit 361 notifies of deletion success. In a case where the license deletion is a failure in step S805, the communication unit 361 notifies of deletion failure.

In steps S807 to S809, as in steps S611 to S613, in the device management server 105, the registration of the replacement source device (for example, the image forming apparatus 102) is cancelled. In step S807, information (for example, "DEV102") that specifies the replacement source device (for example, the image forming apparatus 102) included in the registration cancellation request is specified in step S803.

In step S810, the device registration unit 342 of the printing management server 104 generates a registration code request after the replacement code has been determined to be valid in step S803. The communication unit 341 of the printing management server 104 transmits the registration code request to the device management server 105. The registration code request may be a request asking for a registration code to be issued. The registration code request may include the serial number (for example, "DEV103") of the image forming apparatus 103 included in the continuation request. Also, the registration code request may include the title (for example, "NewPrinter") of the image forming apparatus 103 included in the continuation request. In this manner, the registration code request may include the serial number (for example, "DEV103") of the device to be registered and the title (for example, "NewPrinter") of the device.

In step S811, the communication unit 351 of the device management server 105 passes the registration code request received from the printing management server 104 to the device registration unit 352. The device registration unit 352 generates a new record in the device management table 450 and stores the information included in the registration code request in the record. Specifically, the device registration unit 352 stores the serial number included in the registration code request in the serial number column 451 and stores the title included in the registration code request in the title column 452. The code issuing unit 353 of the device management server 105 issues a registration code and stores the record in the registration code column 454.

In this manner, for example, a record 456 is added to the device management table 450. In the record 456, the serial number (for example, "DEV103") included in the registration code request and a registration code (for example, "3309-2234) generated in response to the registration code request are associated together. In this manner, the code issuing unit 353 issues a registration code associated with the device to be registered. At this point in time, the MAC address column 453 is blank. Thus, the image forming apparatus 103 is still not registered in the device management server 105.

In step S812, the communication unit 351 of the device management server 105 transmits the registration code issued in step S503 to the printing management server 104. In step S813, the communication unit 341 of the printing management server 104 transmits the registration code received from the device management server 105 to the image forming apparatus 103.

In steps S814 to S816, as in steps S506 to S508, the replacement destination device (for example, the image forming apparatus 103) is registered in the device management server 105. In step S814, the registration code included in the registration request is the registration code received in step S813.

In step S817, the connection application 322 of the image forming apparatus 103 notifies the printing management server 104 that registration is complete in response to the registration in the device management server 105 being successful. In step S818, the communication unit 341 of the printing management server 104 requests the device management server 105 for the information of the image forming apparatus 103. In step S819, the communication unit 351 of the device management server 105 transmits the information of the image forming apparatus 103 to the printing management server 104. The device management unit 344 of the printing management server 104 stores the received information for subsequent processing.

In step S820, the license registration unit 343 of the printing management server 104 generates a license provide request. The communication unit 341 of the printing management server 104 transmits the license provide request to the license management server 106. The license provide request may be a request asking for a license to be provided to a device. Specifically, the license provide request may be a request asking for a license to be provided to the replacement destination device. The license provide request may include information (for example, "DEV103") that specifies the replacement destination device (for example, the image forming apparatus 103). This information may be information included in the continuation request. Also, the license provide request may include service identification information (for example, "Printer") of the printing service provided by the printing management server 104.

In step S821, the communication unit 361 of the license management server 106 passes the received license provide request to the license management unit 362. The license management unit 362 changes the license being managed according to the license provide request. Specifically, the license management unit 362 generates a new record in the license management table 460 and stores the information included in the license provide request in the record. Specifically, the license management unit 362 stores the service identification information included in the license provide request in the service identification information column 461 and stores the serial number included in the license provide request in the serial number column 462. In this manner, a license is provided to the replacement destination device (for example, the image forming apparatus 103).

In step S822, the communication unit 361 of the license management server 106 transmits the result of the license provide request to the printing management server 104. Specifically, in a case where the license provision is a success in step S821, the communication unit 361 notifies of provision success. In a case where the license provision is a failure in step S821, the communication unit 361 notifies of provision failure.

In step S823, the communication unit 341 of the printing management server 104 transmits the result of the continuation request to the image forming apparatus 103. Specifically, in a case where none of the operations described above failed, the communication unit 341 notifies of continuation success. In a case where any one of the operations described above failed, the communication unit 341 notifies of continuation failure. The image forming apparatus 103 may present the result of the continuation request to the user.

Figure 8:
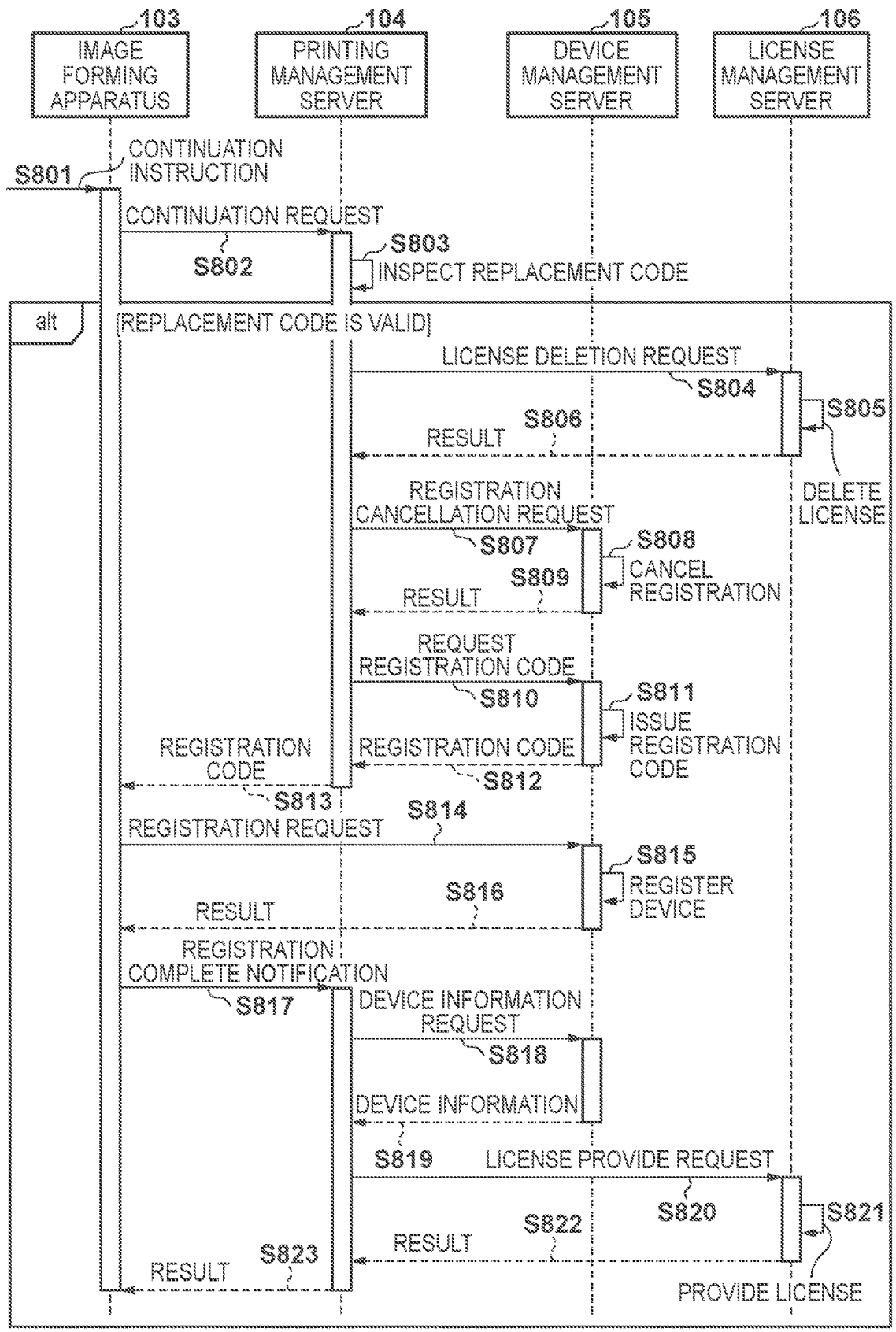
FIG. 8 is a sequence diagram for describing an example of continuation processing according to some embodiments.

In the operations illustrated in FIG. 8, the printing management server 104 may execute steps S804, S807, and S810 in any order after the replacement code is determined to be valid in step S803. Also, the printing management server 104 may execute steps S818 and S820 in any order after the registration complete notification in step S817.

According to the embodiment described above, a user trying to replace a device can start the replacement processing and obtain a replacement code even if the replacement destination device is not in possession. The user can replace the device by continuing the processing after the replacement destination device is obtained. Also, if a replacement notice has been executed in advance, the user can perform device replacement without the replacement source device.

According to the embodiment described above, by sending a replacement instruction (step S601) to the PC 101, in the plurality of management servers (for example, the device management server 105 and the license management server 106), a device can be replaced. This reduces the amount of effort needed by the user when replacing a device.

MODIFIED EXAMPLES

A modified example of the embodiment described above will now be described with reference to FIG. 9. In the operations illustrated in FIG. 6, in step S601, the PC 101 obtains a replacement instruction from the user. Alternatively, in the operations illustrated in FIG. 9, instead of the PC 101, the replacement source device (in this example, the image forming apparatus 102) obtains the replacement instruction from the user.

In step S801, the connection application 322 of the image forming apparatus 102 obtains a replacement instruction from the user via the operating unit 270. The replacement instruction may be an instruction to replace the image forming apparatus 102 being managed. At the point in time of step S801, the replacement destination device may be decided or may not be decided.

In the modified example, the device (in other words, the image forming apparatus 102) operated by the user is the replacement source device. Thus, the replacement instruction may not include the information that specifies the replacement source device.

The replacement instruction may include information that specifies the replacement destination device (in this example, the image forming apparatus 103). In a similar manner to the example described above, the serial number of the device may be used as the information that specifies the device. The method for obtaining the serial number (for example, "DEV103") of the image forming apparatus 103 may be similar to the method for obtaining the serial number of the image forming apparatus 103 described with reference to step S501, and thus this redundant description will be skipped. The replacement destination device may be already registered in the device management server 105 or may not yet be registered. The replacement instruction may not include information that specifies the replacement destination device (in this example, the image forming apparatus 103).

In step S802, the connection application 322 of the image forming apparatus 102 generates a replacement request in response to the replacement instruction being obtained. The communication unit 321 of the image forming apparatus 102 transmits the replacement request to the printing management server 104. The replacement request may be a request asking for device replacement. The replacement request may include the information that specifies that replacement source device. In a similar manner to the example described above, the serial number of the device may be used as the information that specifies the device. The serial number (for example, "DEV102") of the image forming apparatus 102 may be read out from the ROM 253 or the HDD 255 of the image forming apparatus 102. In a case where the replacement instruction includes the serial number (for example, "DEV103") of the image forming apparatus 103 (the replacement destination device), the replacement request may include the serial number of the image forming apparatus 103.

Figure 6:
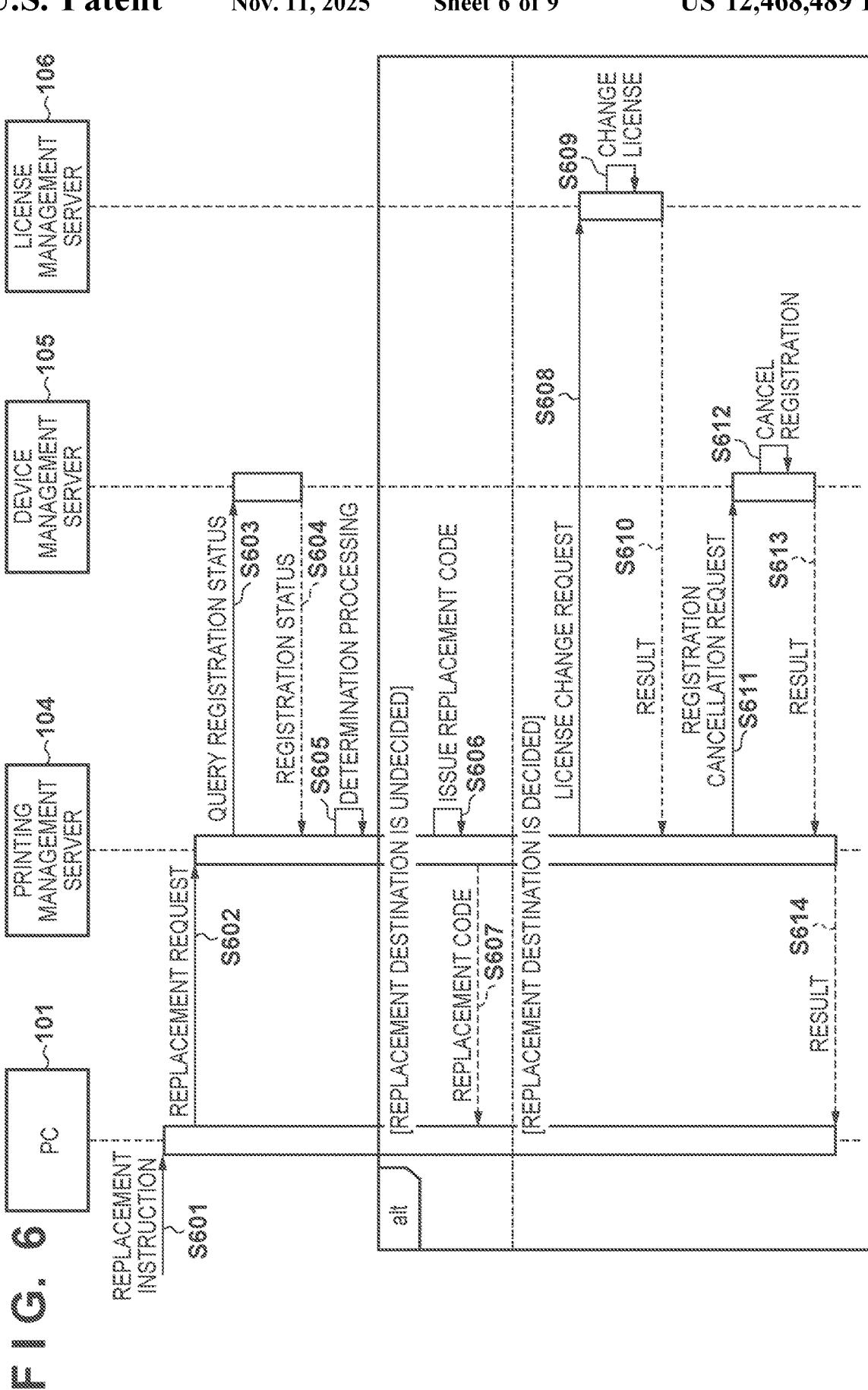
FIG. 6 is a sequence diagram for describing an example of replacement processing according to some embodiments.
Figure 7:
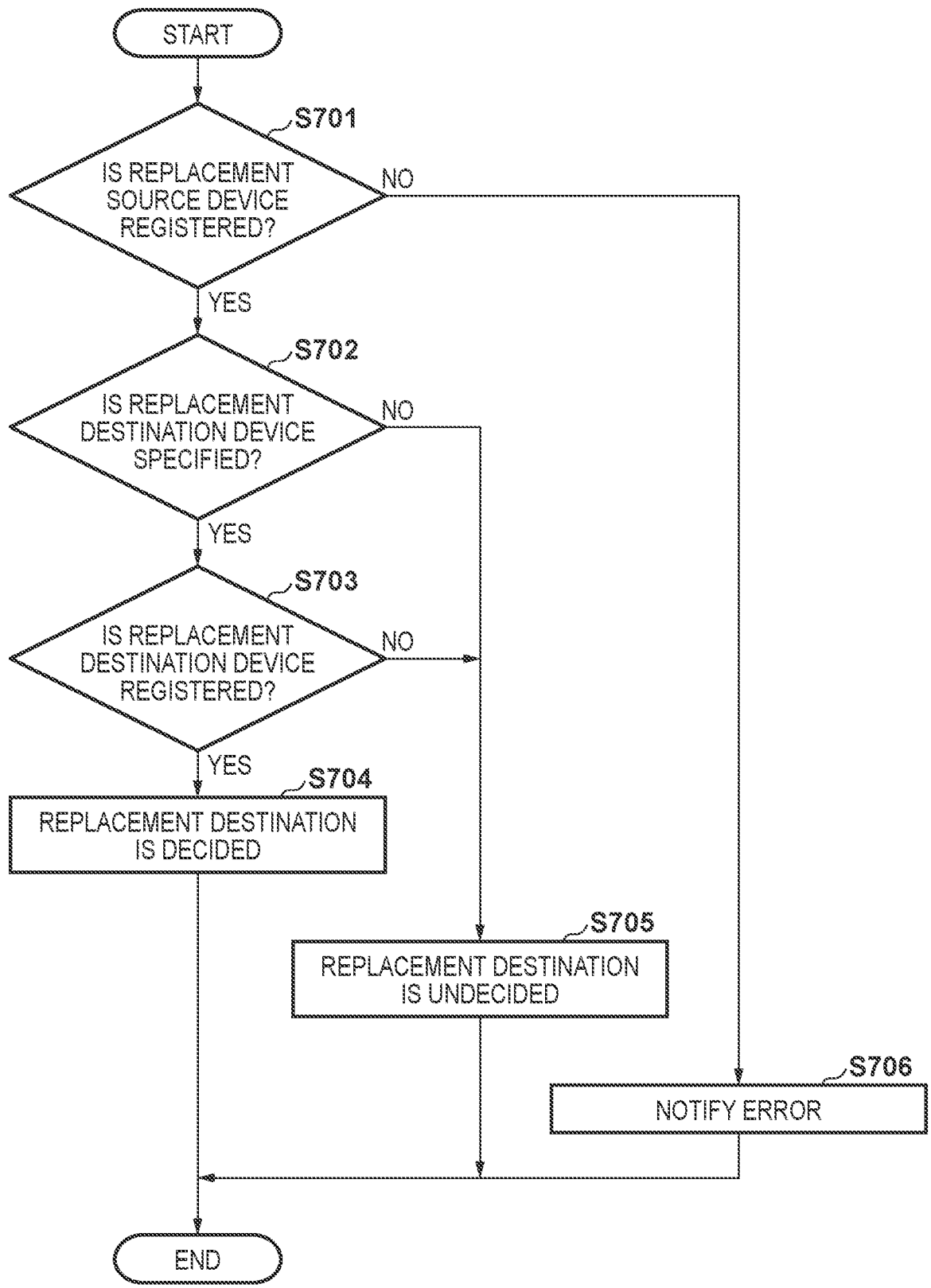
FIG. 7 is a flowchart for describing an example of determination processing according to some embodiments.

The subsequent processing may be similar to that in steps S603 to S614 in FIG. 6, and thus redundant descriptions will be skipped. In the modified example, the replacement instruction can be performed for an apparatus other than the PC 101. Also, by the replacement instruction being performed for the replacement destination device, the input of the information that specifies the replacement destination device can be omitted.

In the embodiment described above, the plurality of devices used in a service provided by the printing management server 104 are managed by both the device management server 105 and the license management server 106. Alternatively, the plurality of devices used in a service provided by the printing management server 104 may be managed by only one of the device management server 105 and the license management server 106 or may be managed by a different server.

In the embodiment described above, the printing management server 104 provides the printing service using the plurality of image forming apparatuses. Alternatively, the embodiment described above may be applied to a service other than a printing service. For example, the service providing apparatus may provide a data collection service that collects various types of data (for example, temperature, traffic situations, power consumption, and the like) from a plurality of devices. Also, the device used by the service providing apparatus to provide the service is not limited to being an image forming apparatus and may be a device such as a home appliance, an illumination device, an air conditioning device, a sensor, and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-198735, filed Dec. 13, 2022, which is hereby incorporated by reference herein in its entirety.

What is claimed is:

1. A service providing apparatus for providing a service using a plurality of devices, which include a replacement destination device and one of an information processing apparatus or a replacement source device, the service providing apparatus comprising:

a memory storing instructions; and
a processor configured to execute the instructions to:
obtain, from the one of the information processing apparatus or the replacement source device, a replacement notice that specifies the replacement source device, which is to be replaced with the replacement destination device, without specifying the replacement destination device or a replacement code associated with the replacement source device, the replacement code also not specifying the replacement destination device;
transmit, to the one of the information processing apparatus or the replacement source device, the replacement code associated with the replacement source device and that does not specify the replacement destination device;
obtain, from the replacement destination device, a continuation request including the replacement code that has been furnished to the replacement destination device, the continuation request specifying the replacement destination device; and request one or more management servers to manage the replacement destination device specified in the continuation request instead of the replacement source device associated with the replacement code included in the continuation request.

2. The service providing apparatus according to claim 1, wherein:

the one or more management servers include a license management server configured to manage a license for accessing the service for the replacement destination device, and the processor, in requesting the one or more management servers to manage the replacement destination device instead of the replacement source device:

requests the license management server to delete a license provided to the replacement source device; and requests the license management server to provide a license to the replacement destination device.

3. The service providing apparatus according to claim 1, wherein:

the one or more management servers include a device management server configured to manage a device registered with the service, and the processor, in requesting the one or more management servers to manage the replacement destination device instead of the replacement source device:

requests the device management server to cancel registration of the replacement source device; and requests the device management server to register the replacement destination device.

4. The service providing apparatus according to claim 3, wherein the processor, in requesting the device management server to register the replacement destination device:

obtains a registration code for the replacement destination device from the device management server; and transmits a registration request including the registration code to the device management server, the registration request specifying the replacement destination device.

5. The service providing apparatus according to claim 1, wherein the one of the information processing apparatus or the replacement source device is the replacement source device.

6. The service providing apparatus according to claim 1, wherein the one of the information processing apparatus or the replacement source device is the information processing apparatus.

7. The service providing apparatus according to claim 1, wherein the service providing apparatus is a printing management server.

8. The service providing apparatus according to claim 1, wherein the replacement source device and the replacement destination device each is an image forming apparatus.

9. The service providing apparatus according to claim 8, wherein the service provided by the service providing apparatus includes a printing service.

10. A non-transitory computer-readable storage medium that stores a program executable by a computer to execute a method of controlling a service providing apparatus configured to provide a service using a plurality of devices, which include a replacement destination device and one of an information processing apparatus or a replacement source device, the method comprising:

obtaining, from the one of the information processing apparatus or the replacement source device, a replacement notice that specifies the replacement source device, which is to be replaced with the replacement destination device, without specifying the replacement destination device or a replacement code associated with the replacement source device, the replacement code also not specifying the replacement destination device;

transmitting, to the one of the information processing apparatus or the replacement source device, the replacement code associated with the replacement source device and that does not specify the replacement destination device;

obtaining, from the replacement destination device, a continuation request including the replacement code that has been furnished to the replacement destination device, the continuation request specifying the replacement destination device; and requesting one or more management servers to manage the replacement destination device specified in the continuation request instead of the replacement source device associated with the replacement code included in the continuation request.

11. A method of controlling a service providing apparatus configured to provide a service using a plurality of devices, which include a replacement destination device and one of an information processing apparatus or a replacement source device, the method comprising:

obtaining, from the one of the information processing apparatus or the replacement source device, a replacement notice that specifies the specifying a replacement source device, which is to be replaced with a replacement destination device, without specifying the replacement destination device or a replacement code associated with the replacement source device, the replacement code also not specifying the replacement destination device;

transmitting, to the one of the information processing apparatus or the replacement source device, the replacement code associated with the replacement source device and that does not specify the replacement destination device;

obtaining, from the replacement destination device, a continuation request including the replacement code that has been furnished to the replacement destination device, the continuation request specifying the replacement destination device; and requesting one or more management servers to manage the replacement destination device specified in the continuation request instead of the replacement source device associated with the replacement code included in the continuation request.

\* \* \* \* \*